(12) United States Patent
Thoreux

(10) Patent No.: US 8,348,343 B2
(45) Date of Patent: Jan. 8, 2013

(54) METHOD FOR CONTROLLING THE KINEMATICS OF A SEAT HAVING MOVABLE PORTIONS BY SPACE OF FREEDOM AND SEAT CARRYING IT OUT

(75) Inventor: Loic Thoreux, Courbevoie (FR)

(73) Assignee: Precilec, Auxerre (FR)

( * ) Notice: Subject to any disclaimer, the term of this patent is extended or adjusted under 35 U.S.C. 154(b) by 54 days.

(21) Appl. No.: 12/847,456

(22) Filed: Jul. 30, 2010

(65) Prior Publication Data

US 2011/0025113 A1 Feb. 3, 2011

(30) Foreign Application Priority Data

Jul. 31, 2009 (FR) ...................... 09 55414

(51) Int. Cl.
*B60N 2/02* (2006.01)
*A47C 1/035* (2006.01)
*A47C 1/022* (2006.01)

(52) U.S. Cl. ...................................... 297/330
(58) Field of Classification Search ............. 297/330
See application file for complete search history.

(56) References Cited

U.S. PATENT DOCUMENTS

| | | | |
|---|---|---|---|
| 6,441,576 B1 | 8/2002 | Marin-Martinod et al. | |
| 6,752,463 B2 * | 6/2004 | Nivet | 297/330 X |
| 7,404,603 B2 * | 7/2008 | Dewert | 297/330 |
| 2002/0158497 A1 | 10/2002 | Nivet et al. | |

FOREIGN PATENT DOCUMENTS

| | | |
|---|---|---|
| DE | 102006027994 | 9/2007 |
| FR | 2801480 | 6/2001 |
| FR | 2821252 | 8/2002 |
| WO | 2007107200 | 9/2007 |

OTHER PUBLICATIONS

French Search Report issued in the French Application on Mar. 15, 2010.

* cited by examiner

*Primary Examiner* — Rodney B White
(74) *Attorney, Agent, or Firm* — Young & Thompson

(57) ABSTRACT

A method for controlling the kinematics of a seat having movable portions and actuators for moving the movable portions between an initial position and a final position, at least one movable portion including a specific point, including the steps of establishing, for the specific point, an authorized travel conduit between the initial position and the final position, delimited by two lateral boundaries, calculating the current position of the specific point, establishing a target direction for the specific point that is suitable for moving the specific point in the conduit from the lateral boundaries and the current position, and modifying the direction of the specific point by controlling the actuators in order to force the specific point to move in the conduit.

14 Claims, 3 Drawing Sheets

METHOD FOR CONTROLLING THE KINEMATICS OF A SEAT HAVING MOVABLE PORTIONS BY SPACE OF FREEDOM AND SEAT CARRYING IT OUT

The present invention relates to a seat, of the type comprising at least two portions movable relative to each other and at least two actuators for moving the movable portions in order to modify the configuration of the seat from an initial position to a final position which is determined by a user, at least one movable portion comprising a predetermined specific point. The invention is used in the field of seats of passenger transport vehicles, such as aircraft and trains.

BACKGROUND OF THE INVENTION

In order to improve passenger comfort, a large number of seats are provided with electrical actuation devices allowing modification of the configuration of the seat by movable portions thereof being moved.

For example, such a seat comprises an inclinable backrest and a legrest, each articulated to an end of a seat portion, the legrest is generally extended by a sliding footrest. They are each moved by an individual actuator. Sometimes, the seat itself can move in its entirety in relation to the fixed base of the seat under the control of an actuator.

When some portions of the seat strike obstacles, that may lead to damage to those obstacles (for example, luggage) and the seat, and thereby reduce the service life of the seat. In order to overcome those disadvantages, the unit for controlling the seat comprises means for controlling the command for each of the actuators.

Such a seat is mechanically modelled by a set of specific points, for example, the free end of the backrest or the footrest, and each specific point is moved in accordance with a previously defined trajectory which is associated therewith and which allows each specific point to avoid the obstacles in order to move from a first to a second predetermined position. Software allows the speed of the or each actuator involved in the movement of the specific point to be controlled so that it best follows the associated trajectory. Each change in predetermined position requires resetting of the associated trajectories.

Although that solution for controlling the actuators prevents some portions of the seat from striking obstacles in an effective manner, the definition of the trajectories is extremely complex to carry out, especially since the seat comprises a large number of movable portions (and as many actuators).

Furthermore, the control of the speed of each actuator involved in the movement of the movable portions of the seat into a predetermined position is continuous because the current position of each specific point of the movable portions must be on the trajectory. Consequently, the current position of each specific point is constantly corrected in order to follow the predetermined trajectory.

SUMMARY OF THE INVENTION

An object of the invention is to provide a vehicle seat, and a method for controlling its kinematics allowing the adjustment of the configurations of the seat to be facilitated, particularly in predetermined positions, which are imposed by the user by making the control of the trajectories more permissive.

To that end, the invention relates to a method for controlling the kinematics of a seat of the above-mentioned type, characterised in that it comprises the following steps for each specific point:
- establishing, for the or each specific point, an authorised travel conduit between the initial position and the final position, the travel conduit being delimited by at least two opposite lateral boundaries;
- calculating the current position and the current movement direction of the specific point;
- establishing a target direction for the specific point that is suitable for moving the specific point in the authorised travel conduit from the at least two boundaries of the associated travel conduit and the current position of the specific point; and
- modifying the direction of the specific point by controlling at least one actuator in order to force the specific point to move in its associated travel conduit in the target direction as far as the final position of the seat.

According to specific embodiments, the method for controlling the kinematics of a seat comprises one or more of the following features:
- each boundary of the travel conduit comprises a set of polynomial curves;
- the method comprises, for each specific point, a step of calculating the current speed of the or each actuator which is associated with the specific point and the step of modifying the direction of the specific point comprises a step of controlling the speed of the or each actuator in order to modify the direction of the specific point in order to force the specific point to move in the associated travel conduit thereof in the target direction as far as the final position of the seat;
- the control of the speed of the or each actuator is a function, for each specific point, of the current position of the specific point relative to the boundaries of the associated travel conduit and the movement of the specific point brought about by each actuator;
- the step of establishing the target direction for the specific point is a function of the current position of the specific point relative to the boundaries of the associated travel conduit and the tangent of the boundaries;
- the method comprises, for each specific point, a step of verifying the initial position of the specific point, that verification step being suitable for controlling the or each actuator when the current position of the specific point is located outside the associated travel conduit in order to bring the specific point back into the associated travel conduit; and
- the method comprises, for at least one specific point, a step of modifying the associated travel conduit over time.

The invention also relates to a vehicle seat comprising at least two portions which are movable relative to each other and at least two actuators for moving the movable portions in order to modify the configuration of the seat from an initial position to a final position which is determined by a user, at least one movable portion comprising a predetermined specific point, the seat being characterised in that it comprises, for each specific point:
- means for defining, for the or each specific point, an authorised travel conduit between the initial position and the final position, the travel conduit being delimited by at least two opposite lateral boundaries;
- means for calculating the current position and the current direction of the specific point;

means for establishing a target direction for the specific point that is suitable for moving the seat in the authorised travel conduit from the boundaries of the associated travel conduit;

means for controlling at least one actuator associated with the specific point in order to move the specific point according to the established target direction;

means for comparing the current direction of the specific point and the target direction; and means for modifying the direction of the specific point in order to force the specific point to move in the associated travel conduit thereof in the target direction as far as the final position of the seat.

According to a specific embodiment, the seat comprises means for controlling the speed of the or each actuator in order to modify the direction of the specific point in order to force the specific point to move in the associated travel conduit thereof in the target direction as far as the final position of the seat.

BRIEF DESCRIPTION OF THE DRAWINGS

The invention will be better understood from a reading of the following description which is given purely by way of example and with reference to the drawings, in which.

DETAILED DESCRIPTION OF THE PREFERRED EMBODIMENTS

Figure 1:
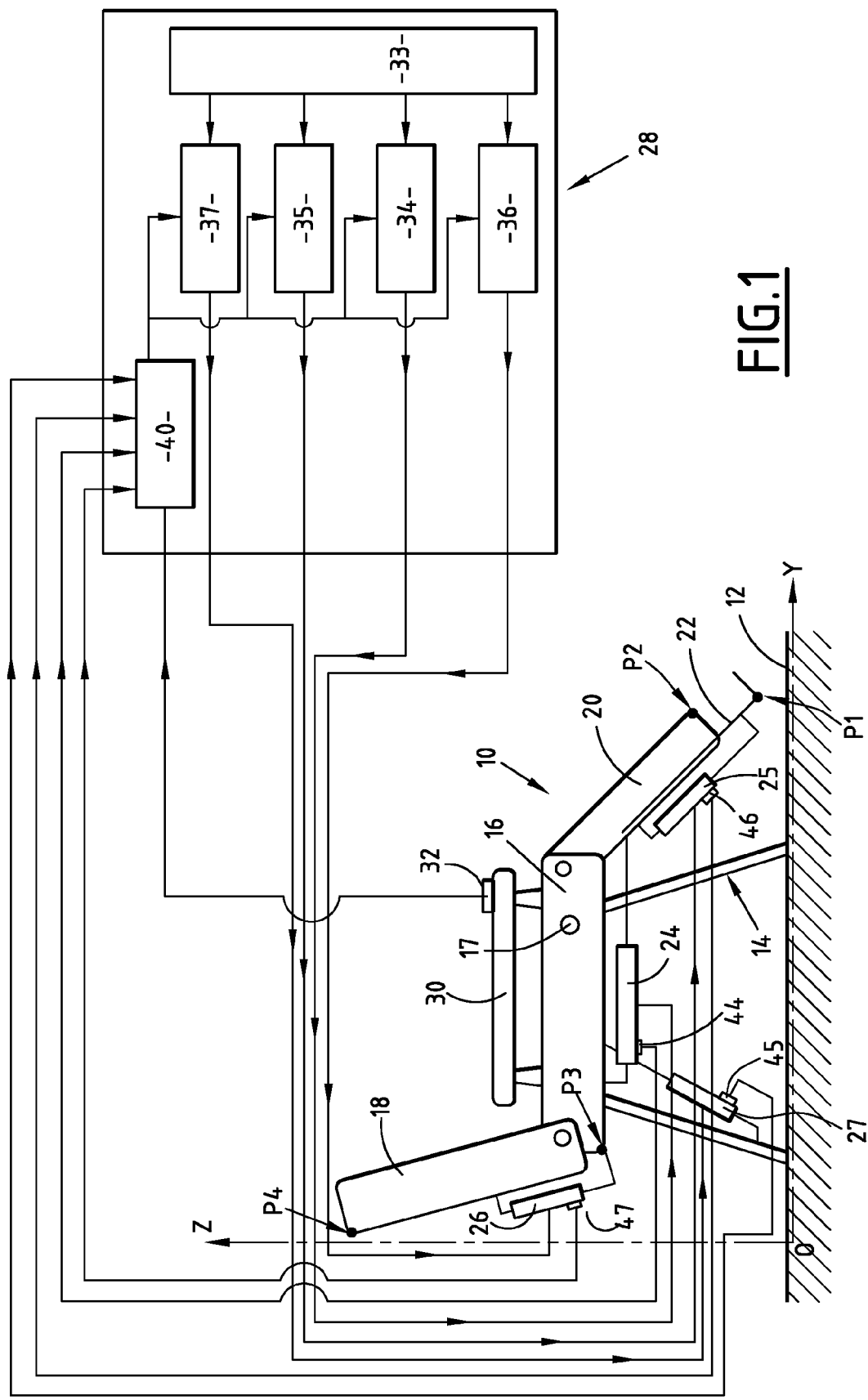
FIG. 1 is a schematic view of a vehicle seat according to the invention.

The seat 10 illustrated in FIG. 1 is a passenger seat of an aircraft. That seat is fixed to the floor 12 of the aircraft.

The seat 10 comprises a base 14 which is fixedly joined to the floor 12 and on which a substantially horizontal seat portion 16 rests.

A backrest 18 and a legrest 20 are each articulated to an end of the seat portion 16.

The backrest 18 can be inclined relative to the seat portion 16 between a substantially vertical raised position and a substantially horizontal lowered position.

The legrest 20 is movable between a substantially vertical lowered position below the seat portion 16 and a substantially horizontal extended position in continuation of the seat portion 16.

The seat 10 further comprises a footrest 22 which is mounted so as to be movable for sliding relative to the legrest 20 in continuation thereof.

The footrest 22 is movable between a position retracted inside the legrest 20 and an extended position in which it extends the legrest and is practically withdrawn.

Four electrical actuators bring about the movement of the movable portions of the seat 10. The four actuators operate at different speeds from one actuator to the next.

A first electrical actuator 24 is mounted between the seat portion 16 and the legrest 20 in order to bring about a movement of the legrest between the lowered position and the extended position thereof.

Similarly, a second electrical actuator 25 is provided between the legrest 20 and footrest 22 in order to bring about the movement of the footrest 22 between the retracted position and the extended position thereof.

A third electrical actuator 26 is mounted between the seat portion 16 and the backrest 18 in order to bring about the movement of the backrest between the raised position and the lowered position thereof.

Finally, a fourth electrical actuator 27 is mounted between the seat portion 16 and the base 14 in order to bring about tilting of the seat portion 16.

The seat comprises a central control unit 28 which is suitable for supplying electric current to each of the four actuators 24 to 27. To that end, the control unit 28 comprises a power source 33 for the actuators which is formed, for example, by a transformer which is connected to the general power supply network of the aircraft by suitable connection means.

The control unit 28 is connected separately to each of the actuators 24 to 27 in order to bring about independent control thereof. In this manner, for each actuator, a power supply interface 34, 35, 36 and 37 brings about the power supply for the actuators 24, 25, 26 and 27, respectively, from the power source 33. Those interfaces bring about the shaping of the supply current of the actuators in accordance with the desired actuation direction.

The power supply interfaces 34 to 37 are controlled by a data-processing unit 40. That data-processing unit 40 comprises, for example, a microprocessor which carries out a suitable programme which is described in the remainder of the description.

The seat further comprises an armrest 30, to which there is fixed a control keypad 32 which allows independent control of the actuators 24 to 27 in order to cause movement thereof.

The data-processing unit 40 is connected to the control keypad 32 in order to receive command instructions from the passenger.

The keypad 32 comprises keys which allow the passenger to achieve a different configuration of the seat from the current configuration. That configuration may be one of the predetermined configurations by a single command acting on one or more actuators, for example, in order to achieve a seated configuration, a lying configuration, etc.

Finally, each actuator is provided with one or more position sensors. Those sensors which are designated 44, 45, 46 and 47 for the actuators 24, 25, 26 and 27, respectively, are connected to the data-processing unit 40. In that manner, the unit 40 is informed of the current position of each actuator. Those sensors are formed, for example, by potentiometers or microswitches which are implanted between the fixed portions and the movable portions of the actuators.

In order to operate the seat, the data-processing unit 40 carries out an algorithm or programme which is known per se in order to control the power supply interfaces 34 to 37 so that they bring about the power supply to the actuators 24 to 27 in one direction or the other by inverting the direction of the current in accordance with the data received from the unit 40.

According to the invention, the algorithm carried out by the data-processing unit 40 is suitable for, in the event of a command for moving at least one portion of the seat by the passenger from the keypad, preventing the movement of the movable portions beyond a predetermined fictive space of freedom E. That space of freedom is fixed in position with spacing from an obstacle, for example, another seat in front of and/or behind the seat involved, luggage, etc. That space of freedom will be described in detail below.

The algorithm carried out in order to control the seat is suitable for establishing the position of a set of predetermined specific points of the seat in a reference system (O, Y, Z), in particular a Cartesian reference system linked to the fixed structure of the seat and in particular the base 14.

The specific points of the seat are formed, for example, by the ends of the movable portions of the seat, those ends constituting the portions of the seat at risk of striking an obstacle during a modification of the configuration of the seat.

In particular, a first specific point P1 is formed by the lower end of the footrest, a second specific point P2 being formed by the upper free end of the legrest.

A third specific point P3 is formed by the lower rear end of the articulated seat portion 16, a fourth specific point P4 being constituted by the upper rear free end of the articulated backrest 18.

The reference system (O, Y, Z) in which there are determined the Cartesian coordinates of the critical points P1 to P4 is illustrated in FIG. 1. That reference system is a direct orthonormal reference system, of which the abscissa axis (O, Y) extends horizontally in accordance with the surface of the floor and of which the ordinate axis (O, Z) extends vertically. The origin O of the reference system is fixed in relation to the base 14.

Furthermore, the data-processing unit 40 comprises means for storing the fictive space of freedom E of each specific point defined in the reference system, it being necessary for the limits of that space of freedom not to be exceeded by the specific point P1 to P4 which is associated therewith.

Figure 2:
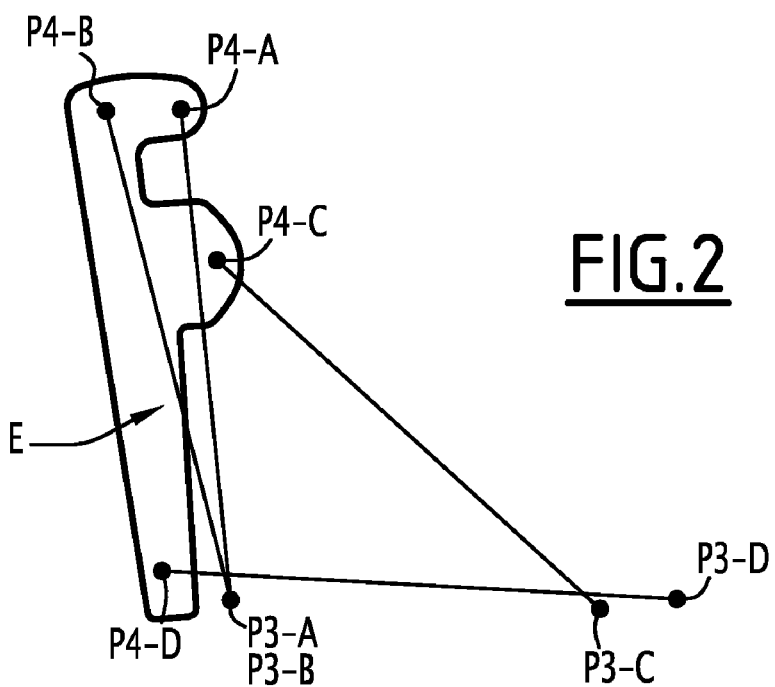
FIG. 2 is a diagram illustrating the movement of the backrest of a vehicle seat and the notion of space of freedom according to the invention.

FIG. 2 illustrates such a space of freedom E for the specific point P4 of the backrest. Four predetermined positions for the backrest are illustrated: an eating position A, standard position B, comfort position C and lying position D. For each of those positions there is illustrated the position of two specific points: one for the seat portion P3 and one for the backrest P4.

In that manner, the specific point P4 of the backrest is obliged to move in that space of freedom E whatever the configuration of the seat.

As soon as a request by the user is detected, the data-processing unit 40 establishes an authorised travel conduit C for each specific point from the initial position and final position of the specific points and in accordance with that space of freedom E.

Figure 3:
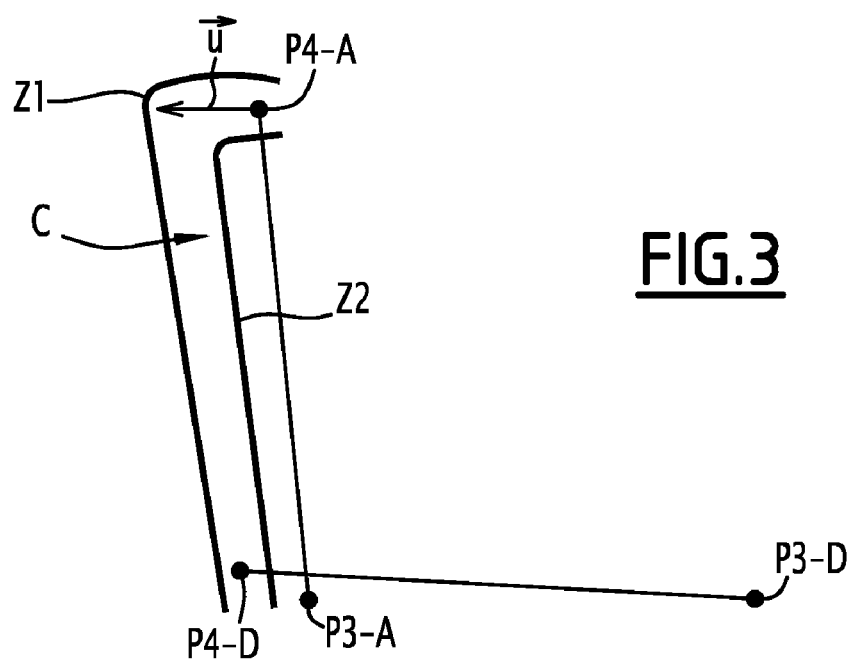
FIG. 3 is a diagram illustrating the movement of the backrest of a vehicle seat and the notion of a travel conduit according to the invention.

For example, such a travel conduit C is illustrated in FIG. 3 for the specific point P4 of the backrest when the user wishes to change from the eating position A to the lying position D.

For each specific point, the travel conduit C preferably comprises at least two opposite lateral boundaries Z1, Z2 which delimit the travel conduit. Those boundaries illustrated in FIG. 3 for the point P4 for the example described above are substantially mutually parallel and are separated by a distance between 2 and 20 cm, preferably between 4 and 6 cm. The boundaries are used so that each specific point moves between those two boundaries Z1, Z2 in the travel conduit intended to guide it between the initial position of the seat and the final position determined by the user.

Each boundary of the travel conduit C comprises a set of polynomial curves.

The storage means of the data-processing unit 40 are also suitable for storing the authorised travel conduit C and the associated boundaries of each specific point.

Figure 4:
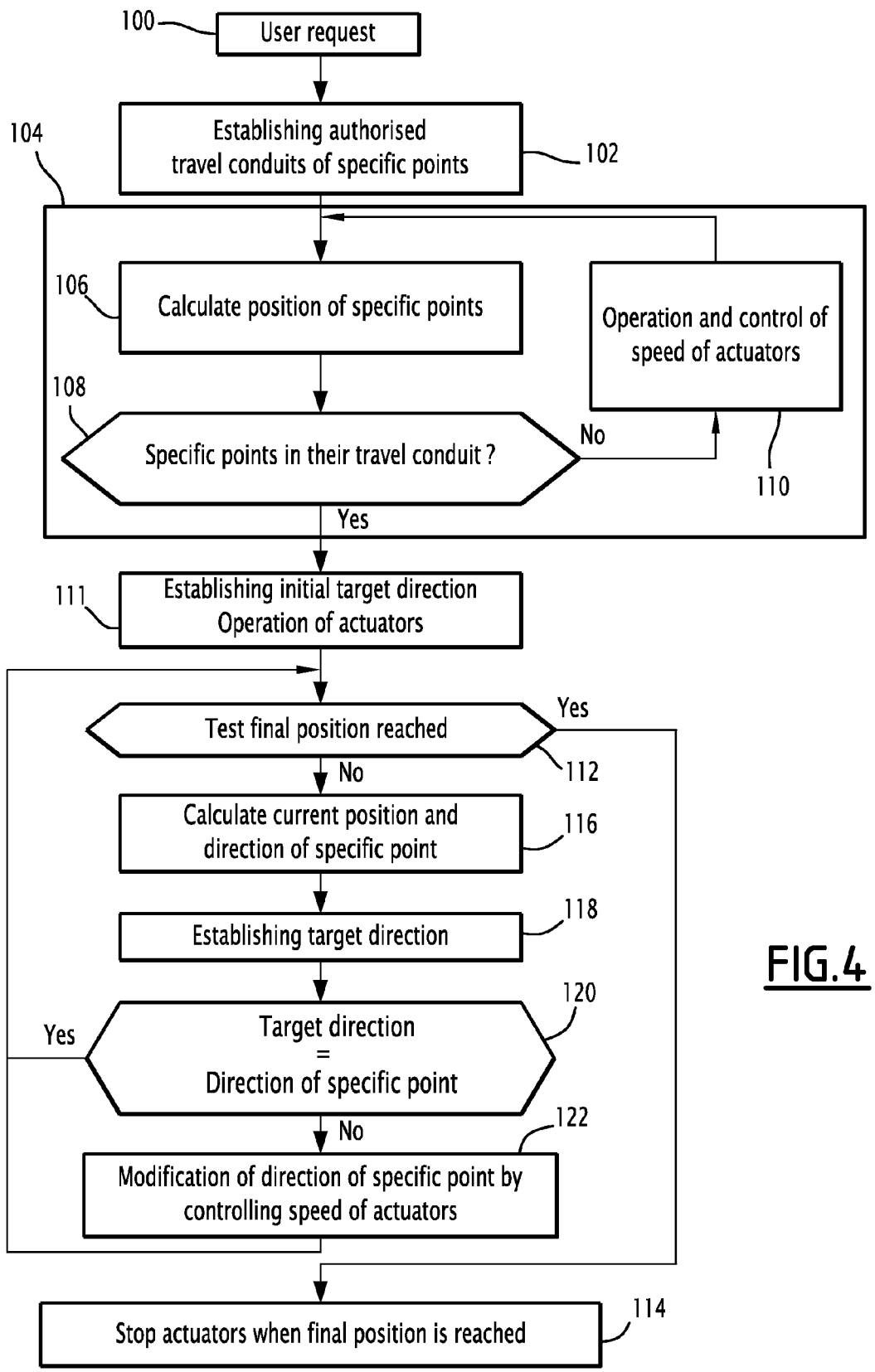
FIG. 4 is a block diagram of a flow chart explaining the operation of the seat by carrying out a method for controlling the kinematics thereof according to the invention.

Whilst the seat is being used, the programme the flow chart of which is illustrated in FIG. 4 is carried out.

At step 100, the data-processing unit 40 interrogates the keypad 32 to determine whether the user has ordered a modification of the configuration of the seat from an initial position to a final position by moving at least one movable portion of the seat.

In that manner, after a request by the user has been detected at step 100, the processing unit 40 establishes for each specific point an authorised travel conduit between the initial position and the final position during a step 102. To that end, it searches in the storage memory for the stored predefined conduit in order to change from one position to the other.

When FIGS. 2 and 3 are viewed, from the predetermined space of freedom E of a specific point, for example, the specific point P4 of the seat portion, the processing unit 40 identifies the boundaries Z1 and Z2 of the travel conduit of the specific point P4 in order to move it from an eating position A (P4-A) to a lying position D (P4-D).

Subsequently, the method comprises, for each specific point, a step 104 for verifying whether the initial position of the specific point really is within the travel conduit thereof.

To that end, during a step 106, the unit 40 establishes by calculation the position of the specific points P1 to P4 in the reference system (O, Y, Z).

Subsequently, at a step 108, it tests whether the specific points really are between the boundaries of the respective travel conduit thereof, in the space of freedom thereof, from the coordinates of the specific points and the equations of the boundaries Z1 and Z2 established in the reference system.

If that is not the case, the verification step 104 is capable of controlling at least one actuator in a step 110 when the current position of a specific point is located outside the associated travel conduit in order to move the specific point back into the associated travel conduit.

The movement of each specific point brought about by operating an actuator will be described in detail below.

If each specific point is in the travel conduit thereof, the method for controlling the kinematics of the seat continues.

The remainder of the description will be given under the consideration that a single specific point associated with a movable portion of the seat, for example, the seat portion, has to move between an initial position and a final position. The following steps are carried out for each specific point in motion in order to modify the configuration of the seat between the initial position and the final position.

During a step 111, the unit 40 establishes an initial target direction for the specific point that is suitable for moving the seat between the initial position and the final position within the authorised travel conduit from the current position thereof. The target direction is derived from the tangent of the boundaries and the distance from the specific point to those boundaries. The closest boundary has most influence on the target direction so that the specific point is "repelled" by the boundaries of the authorised travel conduit.

For example, the following relationship is used to establish an angle $\alpha_{cible}$:

$$\alpha_{cible} = \frac{\alpha_{T1} - \left(\frac{\Pi}{2} - \frac{\Pi}{2}\frac{d_1}{d_1+d_2}\right) + \alpha_{T2} + \left(\frac{\Pi}{2} - \frac{\Pi}{2}\frac{d_2}{d_1+d_2}\right)}{2},$$

where $d_1$ and $d_2$ are the minimum distances between the specific point and the boundaries Z1 and Z2 and $\alpha_{T1}$ and $\alpha_{T2}$ are the angles of the tangents relative to the boundaries Z1 and Z2 at the points of the boundaries where the distance with the specific point is at a minimum, respectively.

In that manner, the closer the specific point is to a boundary, the more the target direction becomes perpendicular to the tangent relative to that boundary. If the specific point is equidistant in relation to the two boundaries, the target direction will be substantially parallel with those boundaries.

That is the case, for example, illustrated in FIG. 3, for the initial target direction of the specific point P4 illustrated by the vector $\vec{u}$ substantially parallel with the conduit C.

Subsequently, the unit 40 orders operation of at least one actuator associated with the specific point in order to move the specific point according to the established initial target direction $\vec{u}$.

During a step 112, the unit 40 verifies whether the final position of the specific point has been reached. In that case, the actuators are stopped during a step 114.

If that is not the case, during a step 116, the unit 40 calculates the current position relative to the boundaries of the associated travel conduit and the current direction of the specific point.

Subsequently, in a step 118, the unit 40 establishes a new target direction for the specific point from its current position. The target direction is established as in the preceding step 111.

At step 120, the current direction of the specific point and the target direction are compared, for example, by a comparison of the angles.

If the current and target directions are identical, the specific point continues to move in its authorised travel conduit by means of the actuators.

If that is not the case, during a step 122, the processing unit 40 controls the actuators in order to modify the direction of the specific point in order to move the specific point according to the new target direction. That modification is carried out by controlling the respective speed of the actuators in order to force the specific point to move in its associated travel conduit as far as the final position of the seat.

One or more actuators may be slowed down, stopped simultaneously or sequentially or have their direction of movement inverted, in order to keep the specific point in its travel conduit.

For each specific point, the control is in accordance with the current position of the specific point relative to the boundaries of the associated travel conduit and the movement of the specific point brought about by each actuator.

To that end, the method comprises, for each specific point, a step of calculating the current speed of the or each actuator associated with the specific point. Indeed, each sensor 44 to 47 measures the position of the actuators 24 to 27, respectively. The data-processing unit 40 further comprises derivation means which are suitable for calculating the derivative with respect to time of the position of each actuator, that is to say, the instantaneous or current speed thereof.

The steps 116 to 120 are repeated until the seat and therefore each specific point has reached its final position determined by the user. In that case, the actuators are stopped during a step 122.

In known manner, the final position is recognised as being reached when the distance between the current position of each specific point and the respective theoretical final position thereof is less than another predetermined threshold value.

That algorithm necessitates only a precise calculation of the position in the predetermined reference system of the critical points of the seat, that position being able to be calculated relatively easily from the position values provided by each of the actuators and the geometric structure of the seat.

In that manner, it will be appreciated that the algorithm carried out allows the seat to reach a very large number of configurations, those configurations being defined in such a manner that each specific point is in its associated and predetermined fictive space of freedom.

The method further comprises, for at least one specific point, a step of modifying the associated travel conduit over time. Indeed, at least one portion of the definition of the fictive travel conduit C may evolve over time in accordance, for example, with the known position of an obstacle which can move in the proximity of the seat.

Such a movable obstacle may be formed, for example, by a motorised pouffe which is movable over the floor surface.

In that case, the travel conduit is defined at a fixed distance from the pouffe, the definition of that conduit evolving over time in accordance with the real position of the pouffe.

In that case, each time the algorithm in FIG. 4 is carried out, the position and/or the shape of the travel conduit or at least one of the boundaries thereof in the reference system (O, Y, Z) are recalculated in accordance with the position of the pouffe over time.

Furthermore, when a seat as described herein is used with a movable pouffe, the control means of the pouffe also carry out an algorithm according to the invention so that a space of freedom and consequently a travel conduit is modified and defined by the envelope of the seat and the control means of the pouffe are adapted in order to prevent at least one critical point defined on the pouffe from exceeding the space of freedom which is associated therewith and which depends on the current position and configuration of the seat.

Owing to the movements of the seat, the position and configuration of the seat evolve over time.

In other words, the seat itself and the pouffe constitute two seats according to the invention, whose control means are adapted to avoid any risk of excessive proximity between a movable element of the seat and a movable element of the pouffe by carrying out, on the one hand, a space of freedom associated with the seat itself and, on the other hand, a space of freedom associated with the pouffe. The fictive spaces of freedom of the seat and the pouffe are used to define the authorised travel conduits, respectively.

The invention claimed is:

1. A method for controlling kinematics of a seat (10) having at least two movable portions (16, 18, 20, 22) movable relative to each other, and at least two actuators (24, 25, 26, 27) configured to move the movable portions in order to modify a configuration of the seat from an initial position to a final position determined by a user, the method comprising:

establishing (102), an authorized travel conduit (C), between the initial position and the final position, for a predetermined specific point of the at least one of the movable portions, the travel conduit (C) being delimited by at least two opposite lateral boundaries (Z1, Z2);

calculating (116) a current position of the specific point and a current movement direction of the specific point;

establishing (118) a target direction for the specific point that is sufficient for moving the specific point in the authorized travel conduit (C) from the at least two boundaries (Z1, Z2) of the associated travel conduit and the current position of the specific point; and modifying (122) a direction of the specific point by controlling at least one of the at least two actuators in order to force the specific point to move within the travel conduit (C) and in the target direction as far as the final position of the seat.

2. The method according to claim 1, wherein each of the at least two opposite lateral boundaries (Z1, Z2) of the travel conduit (C) comprises a set of polynomial curves.

3. The method according to claim 2, further comprising:
calculating a current speed of the at least one of the at least two actuators,
wherein the step (120) of modifying the direction of the specific point further comprises a step of controlling a speed of the at least one of the at least two actuators in order to modify the direction of the specific point in order to force the specific point to move within the travel conduit and in the target direction as far as the final position of the seat.

4. The method according to claim 3, wherein the speed of the at least one of the at least two actuators is a function of the current position of the specific point relative to the at least two opposite lateral boundaries (Z1, Z2) of the travel conduit (C) and a movement of the specific point brought about by any of the at least two actuators.

5. The method according to claim 2, wherein the step (118) of establishing the target direction for the specific point is a function of the current position of the specific point relative to the at least two opposite lateral boundaries (Z1, Z2) of the travel conduit (C) and a tangent of the at least two opposite lateral boundaries (Z1, Z2).

6. The method according to claim 2, further comprising:
verifying an initial position of the specific point in order to control the at least one of the at least two actuators (24, 25, 26, 27) when the current position of the specific point is located outside the travel conduit (C) in order to bring the specific point into the travel conduit.

7. The method according to claim 2, further comprising:
modifying the travel conduit (C) over time.

8. The method according to claim 1, further comprising:
calculating a current speed of the at least one of the at least two actuators,
wherein the step (120) of modifying the direction of the specific point further comprises a step of controlling a speed of the at least one of the at least two actuators in order to modify the direction of the specific point in order to force the specific point to move within the travel conduit and in the target direction as far as the final position of the seat.

9. The method according to claim 8, wherein the speed of the at least one of the at least two actuators is a function of the current position of the specific point relative to the at least two opposite lateral boundaries (Z1, Z2) of the travel conduit (C) and a movement of the specific point brought about by any of the at least two actuators.

10. The method according to claim 1, wherein the step (118) of establishing the target direction for the specific point is a function of the current position of the specific point relative to the at least two opposite lateral boundaries (Z1, Z2) of the travel conduit (C) and a tangent of the at least two opposite lateral boundaries (Z1, Z2).

11. The method according to claim 1, further comprising:
verifying an initial position of the specific point in order to control the at least one of the at least two actuators (24, 25, 26, 27) when the current position of the specific point is located outside the travel conduit (C) in order to bring the specific point into the travel conduit.

12. The method according to claim 1, further comprising:
modifying the travel conduit (C) over time.

13. A seat, (10) comprising:
at least two movable portions (16, 18, 20, 22) movable relative to each other;
at least two actuators (24, 25, 26, 27) configured to move the movable portions and modify a configuration of the seat from an initial position to a final position determined by a user;
means for defining an authorized travel conduit, between the initial position and the final position, for a predetermined specific point of the at least one of the movable portions, the travel conduit being delimited by at least two opposite lateral boundaries;
means for calculating a current position of the specific point and a current direction of the specific point;
means for establishing a target direction for the specific point that is sufficient for moving the seat in the travel conduit from the at least two opposite lateral boundaries of the travel conduit;
means for controlling at least one of the at least two actuators to move the specific point according to the target direction;
means for comparing the current direction of the specific point and the target direction; and
means for modifying a direction of the specific point in order to force the specific point to move within the travel conduit and in the target direction as far as the final position of the seat.

14. The seat according to claim 13, further comprising:
means for controlling a speed of the at least one of the at least two actuators to modify the direction of the specific point in order to force the specific point to move within the travel conduit and in the target direction as far as the final position of the seat.

* * * * *